(12) United States Patent
Ferry

(10) Patent No.: US 11,880,538 B2
(45) Date of Patent: *Jan. 23, 2024

(54) ROUTING ACTIONS TO APPROPRIATE SCENES

(71) Applicant: Apple Inc., Cupertino, CA (US)

(72) Inventor: Kenneth A Ferry, San Francisco, CA (US)

(73) Assignee: APPLE INC., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/657,772

(22) Filed: Apr. 4, 2022

(65) Prior Publication Data

US 2022/0276748 A1 Sep. 1, 2022

Related U.S. Application Data

(63) Continuation of application No. 16/844,184, filed on Apr. 9, 2020, now Pat. No. 11,294,532.

(60) Provisional application No. 62/856,033, filed on Jun. 1, 2019.

(51) Int. Cl.
*G06F 3/0481* (2022.01)
*H04L 51/224* (2022.01)

(52) U.S. Cl.
CPC .......... *G06F 3/0481* (2013.01); *H04L 51/224* (2022.05)

(58) Field of Classification Search
CPC ............................. G06F 3/0481; H04L 51/224
See application file for complete search history.

(56) References Cited

U.S. PATENT DOCUMENTS

| | | | |
|---|---|---|---|
| 9,990,128 B2 | 6/2018 | Peterson et al. | |
| 2014/0258883 A1* | 9/2014 | Duarte | G06F 16/285 |
| | | | 715/752 |
| 2014/0282114 A1 | 9/2014 | Walkin et al. | |
| 2015/0163188 A1 | 6/2015 | Faaborg | |
| 2017/0083590 A1* | 3/2017 | Jagarlamudi | G06Q 10/109 |
| 2017/0230806 A1* | 8/2017 | Shelkovin | H04L 67/535 |
| 2018/0032529 A1* | 2/2018 | Aradhye | G06F 3/0482 |
| 2018/0160431 A1 | 6/2018 | Thies | |
| 2019/0087152 A1 | 3/2019 | Aggarwal | |
| 2020/0057541 A1 | 2/2020 | Wantland | |

* cited by examiner

Primary Examiner — Mong-Shune Chung
(74) Attorney, Agent, or Firm — Womble Bond Dickinson (US) LLP

(57) ABSTRACT

Systems and methods are disclosed that can selectively route actions, such as notifications, to cause activations of one or more applications based on data associated with the actions and based on activation conditions specified at a scene level by each of the applications.

16 Claims, 3 Drawing Sheets

ROUTING ACTIONS TO APPROPRIATE SCENES

This application is a continuation application of U.S. patent Ser. No. 16/844,184 filed on Apr. 9, 2020, which claims the benefit of U.S. Provisional Patent Application No. 62/856,033 filed Jun. 1, 2019, which is incorporated herein by reference.

BACKGROUND

This disclosure relates to data processing systems that receive content for presentation through applications installed on the system, such as a messaging application or a web browsing application, etc.

Content that is received on a user's system is often announced to the user through one or more notifications on a home screen, such as notifications of a text message or other content that is available for display once the application configured to display the content is launched. Often, this content relates to previously displayed content that was displayed by the application. For example, if the notification is about a new text message for an existing conversation between the user and another user, there will normally be a previously displayed window that contains the existing conversation. Some prior data processing systems require that the text messaging application be launched and running before the notification about a new text message is processed by the running text messaging application so that there is a delay before the new message can be displayed because the messaging application begins after being launched with a new document window or new messages window while the messaging application processes information about the new text message in order to determine which prior conversation, in a set of prior conversations, is the basis for this new text message. A similar situation occurs in multiple window environments when the text messaging application had multiple windows displayed and then a new text message notification is received; in this case, the text messaging application must be launched and then determine which window displayed the conversation that is to contain the new text message. These prior systems introduce a delay in time while the messaging application attempts to determine the appropriate window for the new message.

SUMMARY OF THE DESCRIPTION

The systems and methods described herein can selectively route actions, such as notifications, to cause activations of one or more applications based on data associated with the actions and based on metadata, such as activation conditions, specified for example at a scene level by each of the applications. In one embodiment, a scene level can be a document or particular window or conversation or other content processed by an application, and the scene can be processed, for example, by displaying or editing or otherwise processing content in the window or document by the application. In one embodiment, the activations can include launching the application or bringing the application to the foreground and causing the content associated with the action to be presented by the application in for example the window.

A method according to one embodiment can include the following operations: receiving and storing metadata from an application, the metadata including data that identifies a scene or document or other content processed by the application so that the scene or document or other content can be activated in response to receiving one or more actions; receiving an action and a target content identifier associated with the action; comparing the metadata to the target content identifier; and activating the scene or document or other content in response to the comparison. In one embodiment, the metadata identifies the scene that is activated in response to the comparison and the activating comprises presenting the scene in a user interface of the application. In one embodiment, the metadata can comprise one or more activation conditions and the activating comprises displaying the scene in a foreground window of the application on a display device. In one embodiment, the activating includes launching the application if the application is not executing when the action is received. In one embodiment, the application has processed a plurality of scenes, and each scene in the plurality of scenes as a set of metadata which comprises a set of one or more activation conditions. In one embodiment, the set of one or more activation conditions for each scene in the plurality of scenes includes a can condition indicating a capability of processing the action and a preferred condition. In one embodiment, the comparing operation can comprise determining a match between the target content identifier and the metadata for the scene in the plurality of scenes.

In one embodiment, the method can further include the operations of: receiving a further action and a further target content identifier associated with the further action; comparing the further target content identifier to a set of metadata for a plurality of scenes processed by the application, each scene in the plurality of scenes having metadata that comprises one or more activation conditions; opening a new scene in the application in response to determining, from the comparison, there is no match between the target content identifier and the set of metadata.

In one embodiment, at least one of the action or the target content identifier specifies an identifier for the application such that the application can be identified and launched (or brought to the foreground if already launched and executing) based upon the action. In one embodiment, at least one of the metadata or the comparing or the target content identifier can be modified based on policies for selecting applications to change which application in a set of applications is activated in response to the action.

In one embodiment, the comparing operation and the activating operation and the receiving of the action can be performed at least in part by an application that presents a user interface for selecting and launching applications, which user interface can also present received notifications and also present a locked screen requiring a user to enter user credentials (e.g., a password or a user biometric input such as a fingerprint or a face detect) in order to unlock the device or data processing system.

The aspects and embodiments described herein can include non-transitory machine readable media that store executable computer program instructions that when executed can cause one or more data processing systems to perform the methods described herein when the computer program instructions are executed by the one or more data processing systems. The instructions can be stored in non-volatile memory such as flash memory or dynamic random access memory which is volatile or other forms of memory.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

In one embodiment, actions, such as notifications relating to an application, can be defined by a developer of the application so that the actions can be used to activate (e.g., launch or bring to the foreground) a corresponding or appropriate scene that can be or was processed by the application. The application can also provide metadata (e.g., activation conditions) associated with an appropriate scene processed by the application so that the action can be matched to the appropriate scene based upon a comparison of the metadata and data associated with the actions such as a target content identifier.

Figure 1:
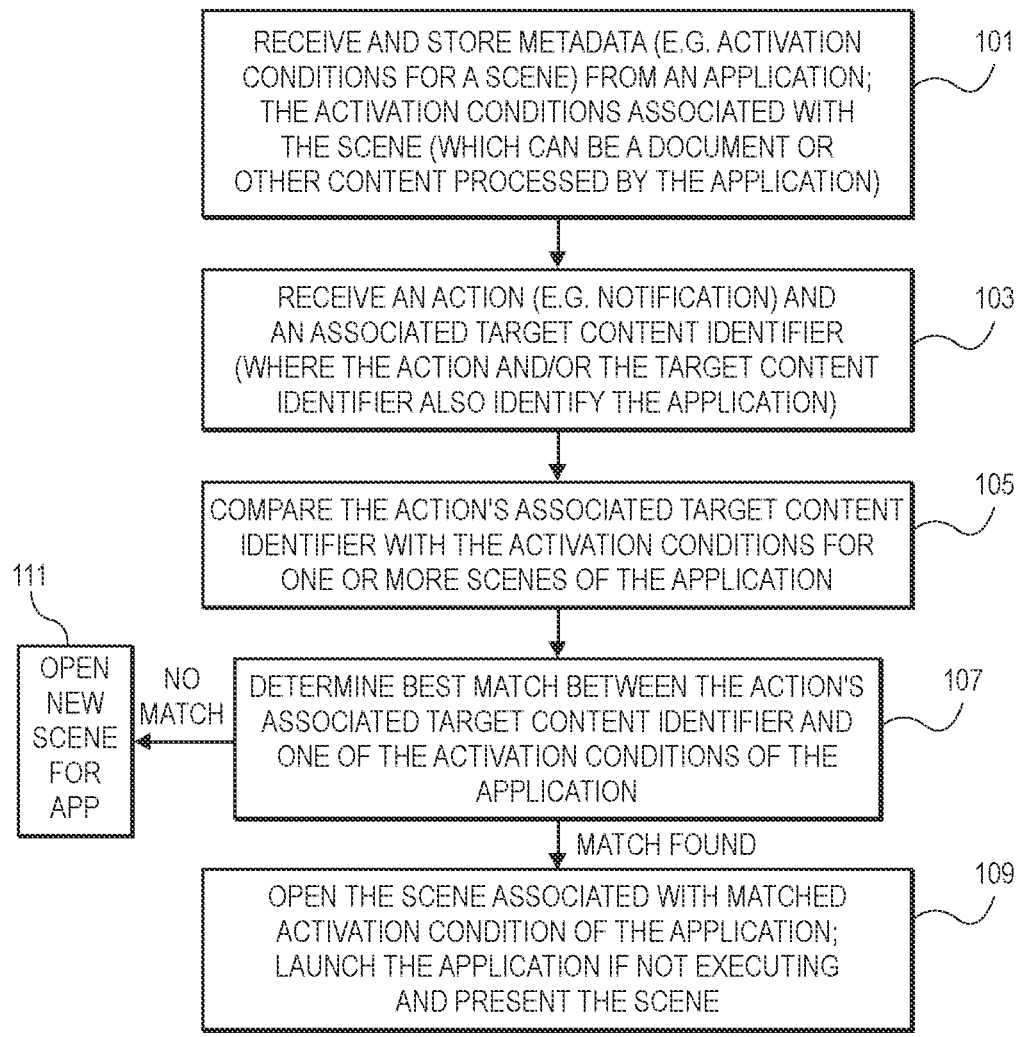
FIG. 1 shows a flowchart that illustrates a method according to one embodiment.

FIG. 1 shows an example of one embodiment that can use this metadata which can include activation conditions and which can be compared to a target content identifier which is associated with a particular action. The method of FIG. 1 can begin in operation 101 in which a data processing system can receive and store metadata from an application. In one embodiment, this metadata can be activation conditions for a particular scene. In one embodiment, a scene can be a window or a document or conversation or other content that can be defined by the developer of the application so that it can be matched to target content identifiers that can also be defined by the developer. A conversation in one embodiment can be a text messaging communication between two or more devices that exchange messages, and these messages can be displayed in a transcript that shows the messages in the communication; U.S. Pat. No. 9,990,128 shows examples of such messages and conversations. A conversation in another embodiment can be email communications between two or more devices or other forms of electronic communication. Further examples of activation conditions, target content identifiers, and scenes are provided further below. In one embodiment, each scene of the application can provide its own activation conditions which are distinct and different from the activation conditions for other scenes of the application. For example, if an application has multiple documents or multiple scenes (e.g., different conversations in the case of a messaging application) which it has processed by presenting or displaying those documents or scenes, each of those documents or scenes can have its own distinct activation conditions which can be matched against target content identifiers as described below. These activation conditions can be particularly useful when an application has multiple windows or scenes opened (either in the foreground and background or all in the background) as the system can route the activation to the appropriate window without requiring the application to perform the processing (e.g. comparing) for the routing. In one embodiment, these activation conditions are received and saved by a system process (such as a process that displays a home screen and is a user interface for browsing and selecting and launching applications); the activation conditions can be saved in storage (e.g. flash memory) that is accessible to the system process so that when an action is received, the system process can retrieve and cause the comparison of the previously stored activation conditions for an application to a target content identifier received in an action without having to launch the application. Even if the application has been launched and is executing, the system process can retrieve and process the activation conditions relative to the target content identifier for the application so that the application does not have to process the action and perform the comparison.

In operation 103, the system can also receive an action which can include an associated target content identifier that is associated with the action. In one embodiment, the action and/or the target content identifier also identifies the particular application associated with the action. For example, if the action is a notification, the notification can specify the particular application associated with the notification. For example, if the notification is a notification of a text message, the notification can include an identifier of the text messaging application along with the target content identifier which can include in the case of a messaging application an identifier of the particular conversation between the user of the device which includes the application and another user of another device who was communicating with the user through the messaging application.

In operation 105, the system can compare the action's associated target content identifier with the activation conditions for one or more scenes of the application, which application was specified by the action or its associated target content identifier. This comparison in operation 105 can attempt to find a best match between the action's target content identifier that is associated with the action and the activation conditions or other metadata of the application. In one embodiment, each document or scene of the application can have a set of one or more activation conditions which can be used to compare against the target content identifier to determine whether or not there is a match between the particular target content identifier associated with the action which has been received and any one of the activation conditions of the application. In one embodiment, the system determines whether a best match exists by comparing the target content identifier against the activation conditions for each scene of the application. One activation condition is a can condition which indicates the content that the scene can present or has the capability of presenting. Another activation condition can be a preferred activation condition which indicates a specific scene or document or other content that that particular scene prefers to process (e.g., display, etc.). The preferred activation condition can specify a particular file or document or scene, such as a particular conversation between the user and another user in a messaging application. The comparison operation can determine in operation 107 whether a best match exists between the action's target content identifier and any one of the activation conditions of the application. If no match exists, then operation 111 is performed; in operation 111, the system opens a new scene for the application rather than using an existing scene or document. On the other hand, if operation 107 determines that a best match does exist, then the system in operation 109 opens the scene associated with the matched activation condition of the application. If the application was not executing at the time that the action was received, then the application will be launched and the content associated with the action can be presented in the scene. If the application was executing at the time that the action was received then the system brings the application to the foreground (if it was in the background) so that the content can be presented in the scene.

In the context of a messaging application, the method of FIG. 1 can receive a notification that a new message has been received from another user, and that notification can include an associated target content identifier which can indicate or specify the conversation with the other user. Moreover, the action or the target content identifier can also specify the messaging application. This can enable the system to use the target content identifier (TCI) to identify the appropriate scene (based on the comparisons of the TCI to the activation conditions of the messaging app) which would be the conversation in the messaging app between the user and that particular other user specified in the target content identifier. Thus, in response to a user selecting the action by selecting the notification, the system can open the conversation directly by using the method of FIG. 1 without having to launch (or bring to the foreground) the messaging application with a new document window or new conversation window and then switch to the appropriate conversation window or document.

The actions which can be used with the embodiments described herein can include notifications, such as push notifications (from a messaging server) relating to messages or push notifications relating to a social media service or push notifications relating to updates to documents that are being shared between devices, where the documents can be stored in cloud storage and the push notifications can come from that cloud storage indicating that the shared document has been updated or is otherwise available for continued use and can be opened on the device in response to the notification. In one embodiment, the example of a notification about a shared document can be used by a user who creates and edits a document on two different devices (first and second devices) that are used by the user. The user can edit the document on the first device and end the session on the first device; the document can then be uploaded to the cloud storage service. The user can then continue working on the document on the second device after receiving a notification (e.g., a push notification) from the cloud storage service. The notification can include a target content identifier that identifies the application (e.g. a word processing application such as "Pages") and the document (e.g. "doc1"); in one embodiment the target content identifier in this example can be:

pages:/document/doc1/paragraph4/word/5

Where the target content identifier specifies the application and the specific scene (a document stored with a file name of "doc1"). The user's second device can have a stored activation condition for this specific scene if the user used this application on the second device to process this document. Thus a comparison of this target content identifier to all of the activation conditions for this application will produce a match for this document.

The actions can also include actions in connection with searches or shortcuts associated with applications. The actions can also be associated with URLs or URIs (such as a custom URL scheme) provided for use by an application (and servers that provide notifications to the application). Reminders that can be presented by an application can also be another form of an action which can be displayed as a notification to cause the launching or opening or activating of the associated reminder application or calendar application.

In one embodiment, the target content identifiers can be designed by a developer of the application so that they can be compared against activation conditions which can also be designed by the developer to match the appropriate content identifiers, such as the target content identifiers. In this way, developers can create notifications and other actions that can be displayed or presented to a user in a home screen or in an application launching screen, and the user can use these actions to activate the appropriate application based upon the comparison between the target content identifier in an action and the previously stored activation conditions from an application.

Figure 2:
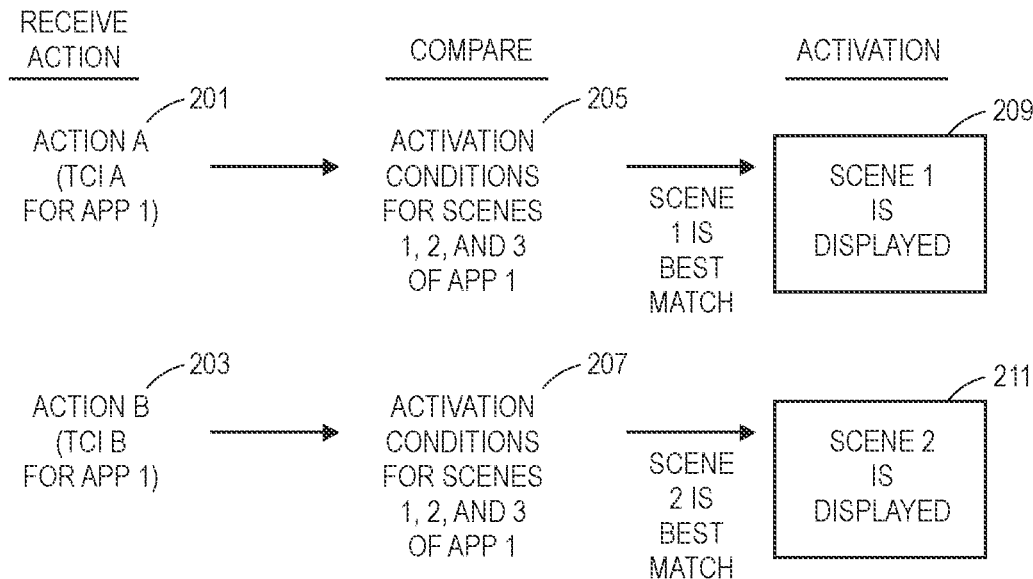
FIG. 2 shows an example of how different actions (e.g. a notification of a text message or an updated document shared among devices through cloud storage) can cause the activation of different scenes (e.g. different documents or other content in a user interface) of an application.

FIG. 2 shows an example of how the received actions can be compared against activations in order to cause the appropriate activation of the scene for an application. In the example shown in FIG. 2 a single application, labeled as App1, is assumed to have processed at least three scenes, labeled as scenes 1, 2, and 3. In one embodiment, the scenes may have been processed by displaying the scenes or editing of the content in the scenes or in other manners known in the art for processing a scene or user interface containing content in an application. In the example shown in FIG. 2, the system receives, over time, two different actions. In particular, at one point in time, the system receives the action 201 which can be the action labeled as action A; this action includes a target content identifier (TCI) labelled as TCI A for App1. At another point in time, the system receives action 203 which includes a target content identifier labeled as TCI B for App1. In one embodiment, action 201 can be a notification which can be selected by the user to cause the comparison 205 in which the activation conditions for the three different scenes (scenes 1, 2, and 3) are compared against the target content identifier TCI A. In response to the comparison, the system determines that scene 1 is the best match between the activation conditions for the three different scenes of App1 and TCI A, and this causes the activation of scene 1 as shown in activation 209. The activation of scene 1 in one embodiment includes launching the application (App1) to display scene 1 if the application was not executing (or idle but loaded) when the action 201 was received; if App1 was executing or idle, activating scene 1 includes bringing scene 1 to the foreground as a foreground process that has the input focus (e.g. keyboard, real or on-screen) such that input is directed to this foreground process. In one embodiment, action 201 may be a notification of a text message from user B, and scene 1 is the conversation between user B and the user of the data processing system which performed the comparison 205 and which activated scene 1 in activation 209. When the data processing system receives action 203, a comparison 207 is performed between the activation conditions for the three different scenes and the target content identifier TCI B associated with action 203. As shown in FIG. 2, the result of the comparison 207 shows that scene 2 is the best match for action B, and thus activation 211 is performed to activate scene 2 so that scene 2 can be displayed in one embodiment on the data processing system which performed the comparison 207. In one embodiment, action 203 may be a notification of a text message from user C, and scene 2 is the conversation between user C and the user of the data processing system which performed the comparison 207 and which activated scene 2 in activation 211. While a text messaging application was used as an example for the application in FIG. 2, it will be appreciated that other types of applications can also be used, such as applications which support sharing of a document between different devices of a document which is being processed on the two different devices through a cloud sharing service etc. Moreover, the application which uses the example shown in FIG. 2 can be a web browsing application which utilizes URLs or other types of applications which support actions that can include target content identifiers as described herein.

In one embodiment, a system application or a set of system applications can perform one or more of the operations shown in FIG. 1 as well as performing the comparison and the receiving of actions shown in FIG. 2. Moreover, the set of system applications can also perform the activation operations described in FIG. 1 and also in FIG. 2. In one embodiment, a system application or other type of application that presents applications for browsing and launching by a user, such as the Springboard application on iOS of Apple Inc. of Cupertino California can perform at least some of the operations shown in FIG. 1 and at least some of the operations shown in FIG. 2. Such an application in one embodiment can also present the home screen which, when the data processing system is locked, shows a lock screen requiring user authentication by the presentation of user credentials (e.g., password or biometric input) in order to unlock the data processing system. The home screen can also show notifications which can be selected by the user; these notifications can include the actions described herein and their associated target content identifiers. When a user selects a notification, the user can cause the comparison in operation 105 in FIG. 1 or operation 205 shown in FIG. 2. The user can select a notification in one embodiment by touching the notification that appears on the home screen of the data processing system.

Figure 3:
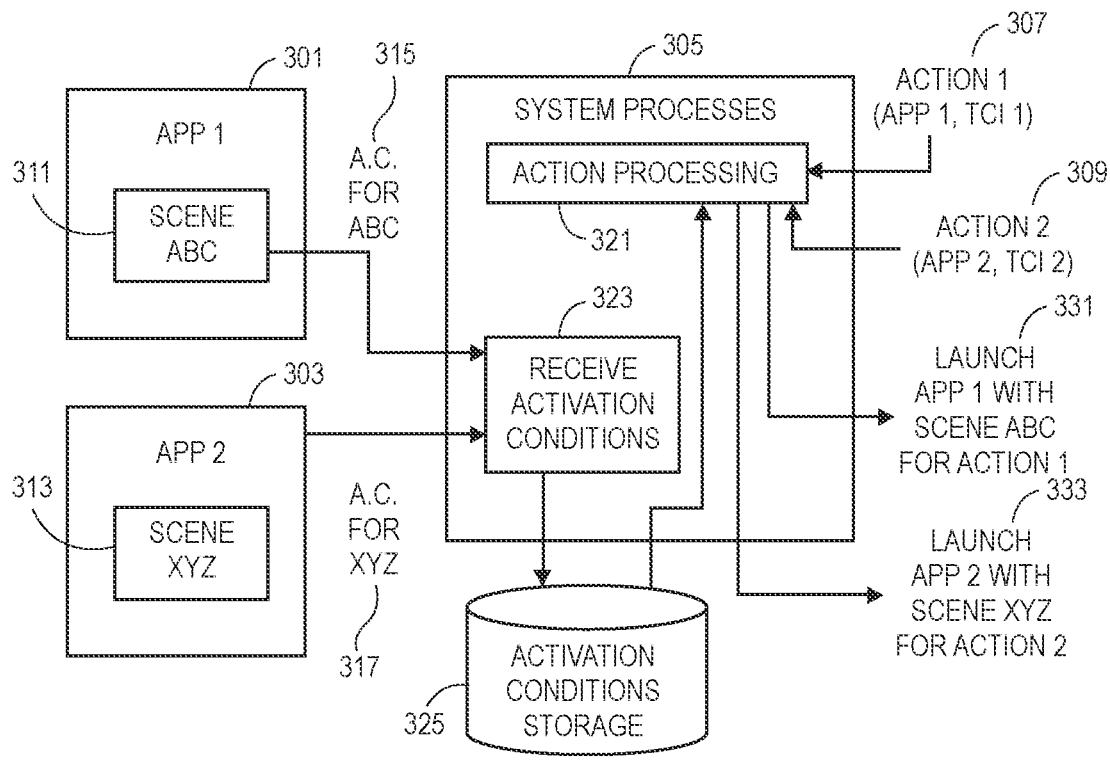
FIG. 3 shows an example of a system that includes two different applications that each have processed (e.g. displayed) at least one scene.

FIG. 3 shows an example of a data processing system that includes at least two applications, each of which can support at least one of the methods described herein. In particular, the application 301 and the application 303 can provide activation conditions for corresponding scenes or documents or other content of the application, where the activation conditions (A.C.) can be specific for the corresponding scenes or documents, etc. Application 301, can display or otherwise process a scene 311; application 301 while it is executing can provide activation conditions, such as activation conditions 315 for scene 311, to system processes 305 which can in turn receive those activation conditions by a receiver 323 and which can store the activation conditions in storage 325. Storage 325 is accessible to system processes 305 even when applications 301 and 303 are not executing and have not been launched; thus, storage 325 can be outside of the sandboxes of applications 301 and 303. Similarly, application 303 can provide activation conditions for scene 313 when the application 303 is executing and these activation conditions can be provided to system processes 305 and received by the receiver 223 which can store the activation conditions 317 for scene 313 in the storage 325. It will be appreciated that each scene for each of the two applications 301 and 303 can have its own unique activation conditions such that each scene can be activated (e.g. launched) based upon the appropriate action that matches the particular activation condition for the scene. Thus, each application in a set of applications can have its own set of activation conditions, and each activation condition can be unique within an application space for each scene that has been processed (e.g., displayed) by the application.

After the activation conditions have been saved in storage 325, the system processes 305 can use these activation conditions when processing actions that are received. The system processes 305 can include action processing logic 321 which can receive the actions and which can cause the activation (e.g., launching or opening) of scenes. For example, when action 307 is received, the action processing logic 321 can compare the target content identifier (TCI 1) associated with action 307 to the activation conditions that have been stored for application 301 and can determine that the target content identifier (TCI 1) matches the activation conditions 315 for the scene 311. In response to determining this match, the action processing logic 321 can cause the display of scene 311 by, for example launching app1 with the presentation or display of the scene 311 in a window of the application 301. If app1 is already launched, the action processing logic 321 can cause the display of scene 311 either within a new window of application 301 or replacing the content of an existing window of application 301 with the content from scene 311. When action 309 is received, the action processing logic 321 can compare the target content identifier (TCI 2) associated with action 309 to the set of activation conditions for application 303. The action 309 includes an identifier for application 303 so that the comparison operation can be limited to activation conditions for application 303. Similarly, the action 307 includes an identifier for application 301 so that the comparison between the target content identifier for action 307 can be limited to activation conditions for the application 301. The action processing logic 321 can determine that the target content identifier (TCI 2) for action 309 matches the activation condition 317 for scene 313 of the application 303, and in response to determining that this match exists, the action processing logic 321 can cause the launch 333 of application 303 to display scene 313 in response to action 309.

In one embodiment, the matching operation can be based upon predicates that are evaluated against the target content identifiers. These allow a scene to express a "yes, I would like to handle this target content identifier" and these target content identifiers can be provided by an application developer for anything that could trigger an activation, such as a notification, shortcut, and user activities. An activation in one embodiment can be the presentation of the scene as a foreground object or window on the data processing system.

In one embodiment, the target content identifier can be a string chosen by the application and can be opaque to the operating system. In one embodiment, the target content identifier should identify the semantic concept that the notification or activity pertains to and not necessarily to a scene but something in the application's user interface model.

Figure 4:
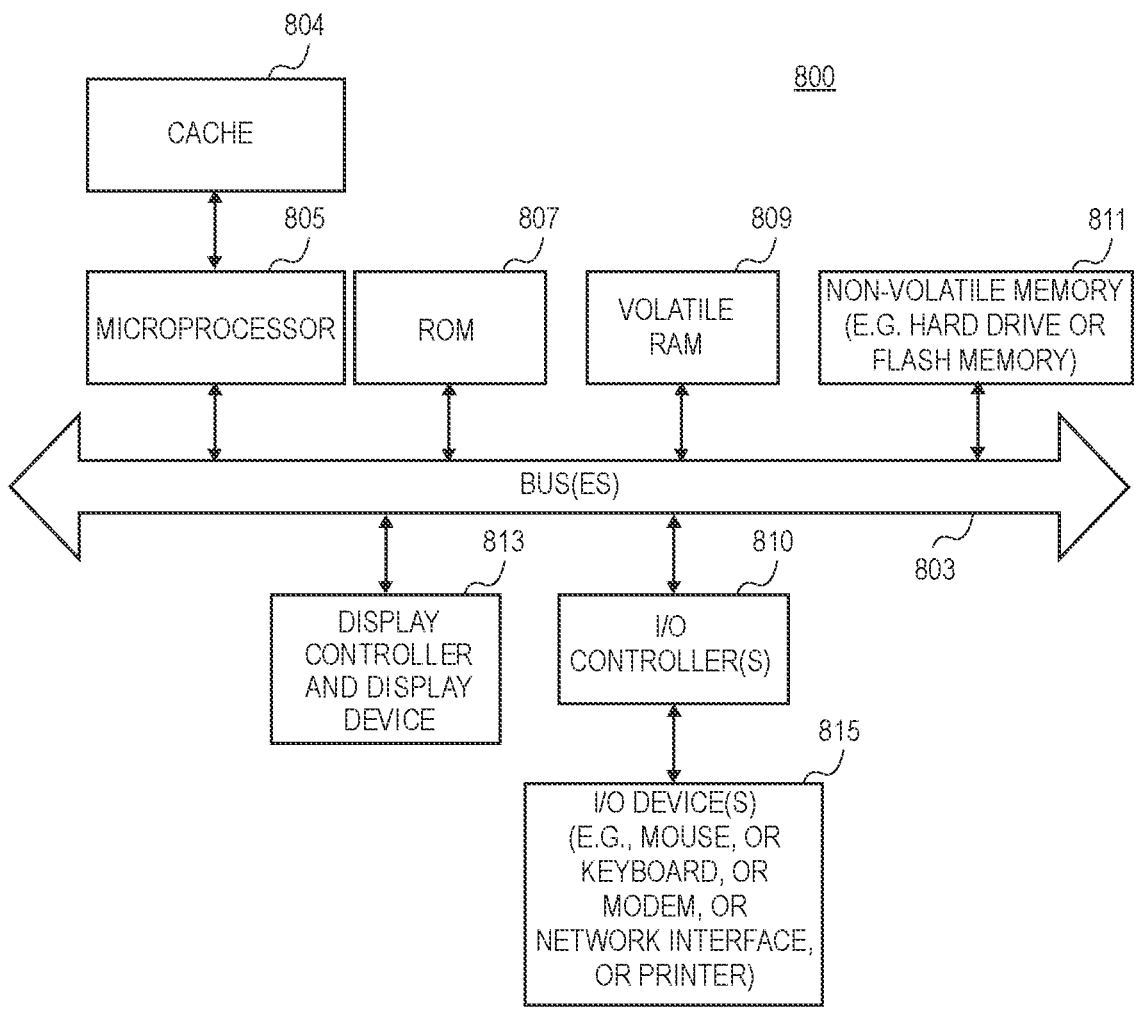
FIG. 4 shows one example of a data processing system which may be used to perform the one or more methods described herein.

FIG. 4 shows one example of a data processing system 800, which may be used with one embodiment. For example, the system 800 may be implemented to include a system as shown in FIG. 3. Note that while FIG. 4 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 4, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 9 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

The following appendix provides further examples of embodiments that include target content identifiers and activation conditions.

What is claimed is:

1. A non-transitory machine readable medium storing executable instructions which when executed by a data processing system cause the data processing system to perform a method, the method comprising:
   generating, by an application, metadata that includes data that identifies a scene or document or other content processed by the application so that the scene or document or other content can be activated in response to receiving one or more actions;
   providing the metadata for use when receiving actions;
   activating, by the application, the scene or document or other content in response to a comparison of the metadata with a target content identifier that is associated with a received action; and
   opening a new scene in the application in response to determining, from a comparison, there is no match between a further target content identifier, associated with a further action, and a set of metadata, the set of metadata for a plurality of scenes processed by the application, each scene in the plurality of scenes having metadata that comprises one or more activation conditions.

2. The non-transitory machine readable medium of claim 1 wherein the metadata identifies the scene that is activated in response to the comparison and the activating comprises presenting, by the application, the scene or the document or the other content in a user interface of the application.

3. The non-transitory machine readable medium as in claim 2 wherein the metadata comprises one or more activation conditions and the activating comprises displaying the scene or the document of the other content in a foreground on a display device in the user interface.

4. The non-transitory machine readable medium as in claim 3 wherein the activating comprises launching the application if the application is not executing when the action is received.

5. The non-transitory machine readable medium as in claim 1 wherein the application has processed a plurality of scenes, and each scene in the plurality of scenes has a set of metadata which comprises a set of one or more activation conditions.

6. The non-transitory machine readable medium as in claim 5 wherein the set of one or more activation conditions for each scene in the plurality of scenes includes a can condition indicating a capability of processing the action and a preferred condition.

7. The non-transitory machine readable medium as in claim 5 wherein the comparison comprises determining a match between the target content identifier and the metadata for the scene in the plurality of scenes.

8. The non-transitory machine readable medium as in claim 1 wherein at least one of the one or more actions or the target content identifier specifies an identifier for the application.

9. A machine implemented method, the method comprising:
   generating, by an application, metadata that includes data that identifies a scene or document or other content processed by the application so that the scene or document or other content can be activated in response to receiving one or more actions;
   providing the metadata for use when receiving actions;
   activating, by the application, the scene or document or other content in response to a comparison of the metadata with a target content identifier that is associated with a received action; and
   opening a new scene in the application in response to determining, from a comparison, there is no match between a further target content identifier, associated with a further action, and a set of metadata, the set of metadata for a plurality of scenes processed by the application, each scene in the plurality of scenes having metadata that comprises one or more activation conditions.

10. The method of claim 9 wherein the metadata identifies the scene that is activated in response to the comparison and the activating comprises presenting, by the application, the scene or the document or the other content in a user interface of the application.

11. The method as in claim 10 wherein the metadata comprises one or more activation conditions and the activating comprises displaying the scene or the document or the other content in a foreground on a display device in the user interface.

12. The method as in claim 11 wherein the activating comprises launching the application if the application is not executing when the action is received.

13. The method as in claim 9 wherein the application has processed a plurality of scenes, and each scene in the plurality of scenes has a set of metadata which comprises a set of one or more activation conditions.

14. The method as in claim 13 wherein the set of one or more activation conditions for each scene in the plurality of scenes includes a can condition indicating a capability of processing the action and a preferred condition.

15. The method as in claim 13 wherein the comparison comprises determining a match between the target content identifier and the metadata for the scene in the plurality of scenes.

16. The method as in claim 9 wherein at least one of the one or more actions or the target content identifier specifies an identifier for the application.

* * * * *